US009469400B1

(12) United States Patent
Irmen (10) Patent No.: US 9,469,400 B1
(45) Date of Patent: Oct. 18, 2016

(54) RECONFIGURABLE SEATBACK FOR IN-SEAT ENTERTAINMENT

(71) Applicant: Greg A. Irmen, Laguna Niguel, CA (US)

(72) Inventor: Greg A. Irmen, Laguna Niguel, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/480,197

(22) Filed: Sep. 8, 2014

(51) Int. Cl.
*A47C 7/62* (2006.01)
*B64D 11/00* (2006.01)
*B64D 11/06* (2006.01)
*B60N 2/48* (2006.01)

(52) U.S. Cl.
CPC ......... *B64D 11/0015* (2013.01); *B60N 2/4876* (2013.01); *B64D 11/00152* (2014.12); *B64D 11/00153* (2014.12); *B64D 11/00155* (2014.12); *B64D 11/06* (2013.01)

(58) Field of Classification Search
CPC .................. B64D 11/0015; B64D 11/00155; B64D 11/00153; B64D 11/00152; B64D 11/06
USPC ................ 297/188.04, 188.07, 217.4, 217.5
See application file for complete search history.

(56) References Cited

U.S. PATENT DOCUMENTS

| | | | | | |
|---|---|---|---|---|---|
| 5,292,174 | A | * | 3/1994 | Ohnuma | 297/188.07 |
| 6,739,654 | B1 | * | 5/2004 | Shen et al. | 297/188.04 |
| 6,905,167 | B2 | * | 6/2005 | Jost | 297/188.04 |
| 7,040,697 | B1 | * | 5/2006 | Tuccinardi et al. | 297/217.3 |
| 7,040,698 | B2 | * | 5/2006 | Park et al. | 297/217.3 |
| 7,188,895 | B1 | * | 3/2007 | Espina et al. | 297/217.3 |
| 7,591,508 | B2 | * | 9/2009 | Chang | 297/217.3 |
| 7,597,393 | B1 | * | 10/2009 | Tuccinardi et al. | 297/217.3 |
| 8,091,959 | B2 | * | 1/2012 | Berger et al. | 297/163 |
| 8,201,203 | B2 | * | 6/2012 | Vitito | 725/75 |
| 8,388,060 | B2 | * | 3/2013 | Chang | 297/217.3 |
| 8,449,031 | B2 | * | 5/2013 | Chang | 297/217.3 |
| 8,540,309 | B2 | * | 9/2013 | Berger et al. | 297/163 |
| 8,702,163 | B2 | * | 4/2014 | Westerink et al. | 297/163 |
| 8,777,310 | B2 | * | 7/2014 | Westerink et al. | 297/217.3 |
| 2004/0239155 | A1 | * | 12/2004 | Fourrey et al. | 297/163 |
| 2009/0127897 | A1 | * | 5/2009 | Watanabe et al. | 297/188.04 |
| 2011/0049943 | A1 | * | 3/2011 | Liu | 297/188.04 |

* cited by examiner

*Primary Examiner* — Adriana Figueroa
(74) *Attorney, Agent, or Firm* — Donna P. Suchy; Daniel M. Barbieri (57) ABSTRACT

A reconfigurable seatback system and methods are described. The reconfigurable seatback system includes a display configured to provide in-flight entertainment to a passenger of an aircraft, a receptacle area and a cover panel. The receptacle area is positioned in a seatback of the aircraft and is configured to releasably receive and hold the display. The cover panel is configured to cover the receptacle area when the display is not positioned within the receptacle area.

20 Claims, 6 Drawing Sheets

RECONFIGURABLE SEATBACK FOR IN-SEAT ENTERTAINMENT

BACKGROUND

The present disclosure relates generally to the field of aircraft seats. More specifically, the present disclosure relates to aircraft seats with in-seat entertainment system capabilities.

Generally, airlines provide different class seating arrangements for passengers. For example, an airline may provide passengers an option for business class seating and coach class seating. The airline also may operate their fleet with common seats between coach class and business class and/or vary the number of business class seats depending on route and season. Some airlines may perform these variations simply by making the middle seat of a 3-3 configured single isle aircraft an empty seat. Although the type of seat is the same, the airline may wish to provide in-seat entertainment capabilities for business class passengers while not providing in-seat entertainment capabilities for coach class passengers. Generally, the variation between the two classes of seats has not allowed airlines to equip their business class seats with in-seat without significant effort. Increased logistical and time considerations, such as having to remove and replace seats, often make airlines hesitant to adjust the seating configuration.

Thus, there is a need for reconfigurable seat systems and methods to allow airlines to have in-seat in-flight entertainment while adjusting the size of business class seating areas. There is further need for an in-seat system to remove displays from the seatback without disruption to any of the other displays on the aircraft. Further still, there is a need for a method of reconfiguring a seatback of a passenger aircraft seat with a receptacle area positioned in the seatback and covering the receptacle area.

SUMMARY

In one aspect, the inventive concepts disclosed herein are directed to a reconfigurable seatback system. The reconfigurable seatback system includes a display configured to provide in-flight entertainment to a passenger of an aircraft. The system also includes a receptacle area and a cover panel. The receptacle area is positioned in a seatback of the aircraft and is configured to releasably receive and hold the display. The cover panel is configured to cover the receptacle area. The cover panel coves the receptacle area when the display is not positioned within the receptacle area.

In a further aspect, the inventive concepts disclosed herein are directed to a reconfigurable seatback compatible with an in-seat entertainment system. The reconfigurable seatback includes a front surface configured to support the back of a passenger sitting in an attached seat. The reconfigurable seatback also includes a back surface facing away from the front surface and a receptacle area positioned within the back surface of the reconfigurable seatback. The receptacle area is configured to securely hold a display releasably positioned therein. The display is a part of the in-seat entertainment system on an aircraft. The receptacle area may further be configured to receive a cover panel which covers the display while positioned within the receptacle area.

In yet another aspect, the inventive concepts disclosed herein are directed to a method of reconfiguring a seatback of a passenger aircraft seat with a receptacle area positioned in the seatback. The receptacle area has a display positioned therein by a quick release mechanism. The method includes engaging the quick release mechanism through an access opening in a frame of the display with a tool and removing the display from the receptacle area. The method also includes attaching a cover panel to the receptacle area of the seatback. The cover panel is substantially flush with a back surface of the seat.

BRIEF DESCRIPTION OF THE DRAWINGS

These and other features, aspects, and advantages of the present disclosure will become apparent from the following description, appended claims, and the accompanying exemplary embodiments shown in the drawings, which are briefly described below, wherein like numerals denote like elements.

DETAILED DESCRIPTION

Before describing in detail the particular improved system and method, it should be observed that the invention includes, but is not limited to, a novel structural combination of conventional data/signal processing components and communications circuits, and not in the particular detailed configurations thereof. Accordingly, the structure, methods, functions, control and arrangement of components have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

According to one embodiment, a reconfigurable seatback system for an aircraft allows individual displays of an in-seat entertainment system (e.g., video) positioned in the seatbacks of passenger seats to be removed without disruption to one or more other displays on the aircraft. The systems and methods described throughout provide for the adjustment of the size of a business class section, for example, without removing seats and offering in-seat/in-flight entertainment to business class customers. In some embodiments, a display 120 may be removed from the aircraft's in-seat entertainment system without disruption to any other display 120 on the aircraft. The display 120 may be received into and securely locked in a receptacle area 110 in the seatback 105. In some embodiments, a removed display 120 is replaced by a cover panel 130 to cover the receptacle area 110. In other embodiments, the cover panel 130 may cover the display 120 while the display is positioned within the receptacle area 110.

Figure 1:
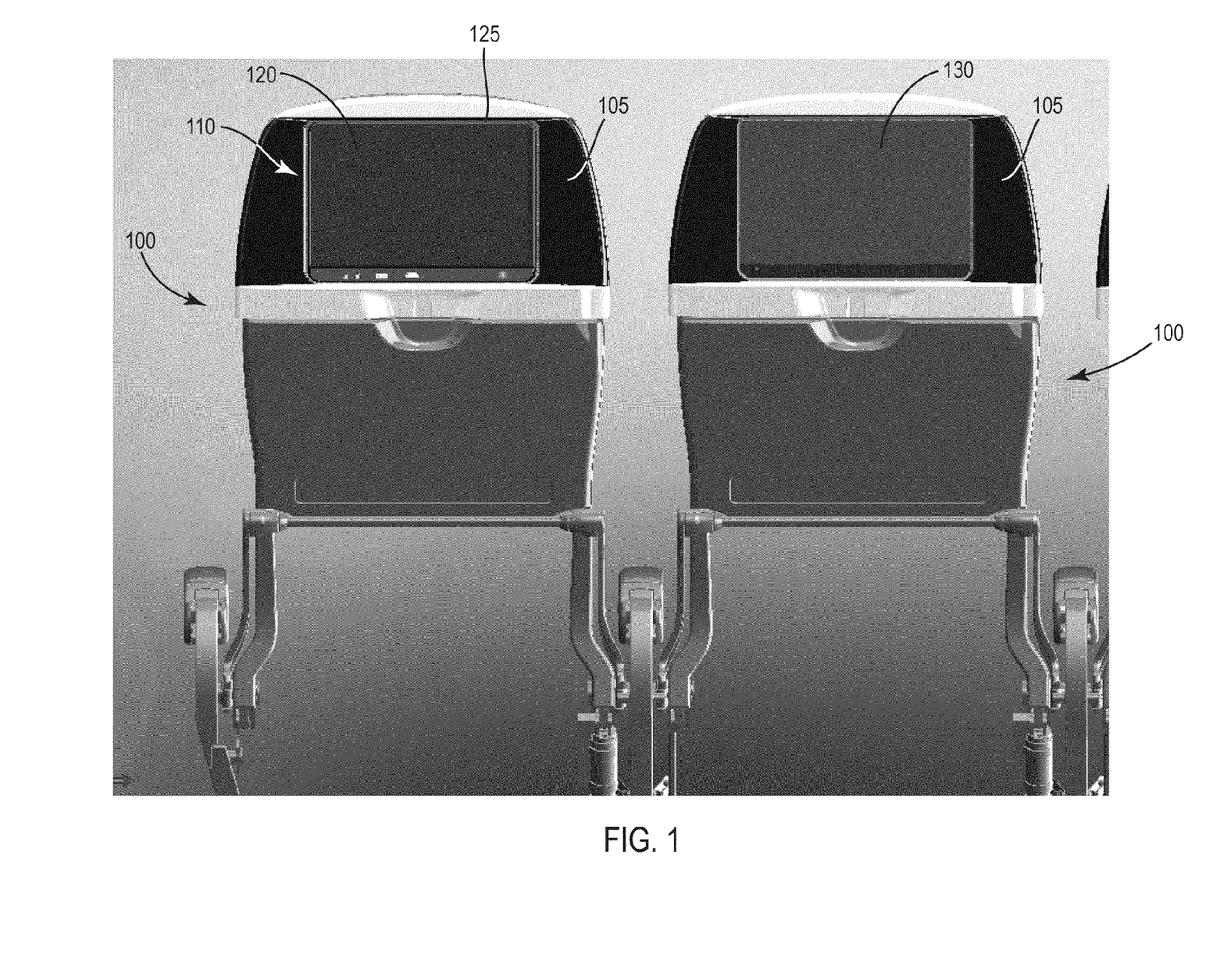
FIG. 1 is a planar rear view schematic illustration of a reconfigurable seatback system having a display in one seatback and a cover panel in another seatback, according to an exemplary embodiment.

Referring to FIG. 1, a planar rear view schematic illustration of a reconfigurable seatback system having a display 120 in one seatback 105 and a cover panel 130 in another seatback is shown according to one embodiment. The reconfigurable seatback 105 system can include one or more of the following: a seatback 105 portion of a seat 100, a receptacle area 110, a display 120, and a cover panel 130. In one embodiment, one surface of the seatback 105 (e.g., a front surface) can be configured to support the back of a passenger sitting in the seat 100. In another embodiment, an opposite surface of the seatback 105 (e.g., a back surface) has a receptacle area 110 disposed within the seatback 105.

According to an embodiment, the receptacle area 110 is configured to hold a display 120 in the seatback 105 such that the display 120 can be viewed by a passenger facing the seatback 105. In FIG. 1, the receptacle area 110 is shown centered in an upper half of the seatback 105. However, the receptacle area 110 may be placed in any position on the seatback 105. For example, the receptacle area 110 may be positioned off-center in the upper half of the seatback 105. According to one embodiment, connective electronics 280 for the display 120 may be disposed within the receptacle area 110 to connect the display 120 to an in-flight entertainment system (e.g., in-seat video system) or network. The receptacle area 110 can also include power connective cables and parts configured to supply power to the display 120. In one embodiment, the receptacle area 110 can be configured in a variety of shapes and sizes (i.e., square, rectangular, circular, etc.) to receive displays having a variety of shapes and sizes. Also, the receptacle area 110 can be configured to hold one display 120 or two or more displays 120.

Still referring to FIG. 1, the display 120 is shown disposed within the receptacle area 110 of the seatback 105. Although the display 120 is shown having a rectangular shape, the display 120 may have other geometric features, including but not limited to a square shape, a circular shape, etc. The display 120 may include a monitor that is a part of an in-seat entertainment system. The in-seat entertainment system is an on-board entertainment system that provides entertainment to passengers during the course of a flight. The in-seat entertainment system entertains the passenger by way of media entertainment implemented through the display 120.

According to some embodiments, the display 120 may allow passengers to access a variety of entertainment or other content during a flight, including but not limited to music, movies, live television, e-books, radio, satellite radio, the internet, games, etc. Content can be made available to a passenger on the display 120 by way of a wired network connection, wireless network connection, pre-downloaded/stored media, etc. In another embodiment, the passenger can have a personal electronic device (i.e., a smartphone, tablet, laptop computer, portable gaming device, portable computing device, etc.) onboard the aircraft and can connect to the in-seat entertainment system to access material (i.e. movies, music, games, books, etc.) from the personal electronic device on the display 120 in the seatback 105. The ability to access material from a passenger's personal electronic device may provide a more convenient trip for the passenger by eliminating the need to bring out the device and put the device away during different portions of a flight (e.g., take-off and landing). According to one embodiment, the display 120 may be implemented as a liquid crystal display. According to another embodiment, the display 120 is a touch screen display 120 that allows users to interact with the entertainment system through touching the screen of the display 120 with an object. Described further below, the display 120 can be configured to connect and disconnect from the receptacle area 110.

The cover panel 130 can be configured to securely cover the receptacle area 110 within the seatback 105. In one embodiment, the display 120 is removed from the receptacle area 110 before the cover panel 130 is connected to the receptacle area 110, thus the display 120 is not positioned in the receptacle area 110 when the cover panel 130 is attached and closed. In another embodiment, the cover panel 130 can be configured to securely connect to the receptacle area 110 while the display 120 remains positioned within the receptacle area 110. According to some embodiments, the cover panel 130 is made of a hard material such that the panel can securely protect the electronic connection and/or display 120 within the receptacle area 110 while withstanding normal wear and tear, tampering by passengers, etc. For example, the cover panel 130 can comprise a hard plastic material that matches a plastic material used on the seat, particularly portions of the seatback 105. According to one embodiment, a water seal can be included to seal the connection between the receptacle area 110 and the cover panel 130. The water seal can be configured to prevent material (e.g., liquid, dust, debri, particles, etc.) from entering the receptacle area 110 and compromising the display 120 or connectors, for example. In some embodiments, the cover panel 130 can have a fabric backing to blend in with the seat cushion covering the upper back portion of the seat.

Figure 2A:
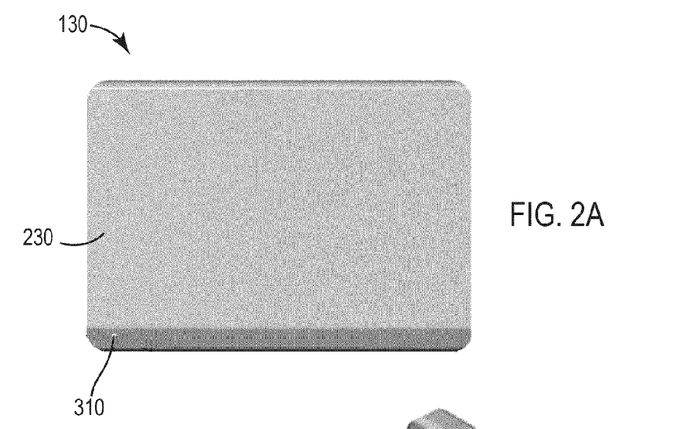
FIG. 2A is a planar rear view schematic illustration of an outer surface of a cover panel, according to an exemplary embodiment.

In FIG. 2A, a planar rear view schematic view illustration of an outer surface 230 of the cover panel 130 is shown according to one embodiment. The outer surface 230 can be covered with a material to match at least a portion of the material of the seatback 105. For example, an upper part of a seatback 105 holding the receptacle area 110 can be covered with a type of fabric. In such case, the outer surface 230 of the cover panel 130 can also include a layer of the same or similar fabric covering the seatback 105 such that the cover panel 130 will blend in with the seatback 105. The cover panel 130 covers the receptacle area 110 such that a passenger sitting behind a seat with a receptacle area 110 that has been covered by the cover panel 130 will generally not notice that the area is configured to hold a display 120. In some embodiments, the cover panel 130 hiding the receptacle area 110 makes the seatback 105 with a receptacle area 110 look similar or identical to, or virtually indistinguishable from a seatback 105 without the receptacle area 110. In some embodiments, the cover panel 130 can also have an access opening 310 as shown in FIG. 2A and described in further detail below. While the access opening 310 is shown disposed within the lower left corner of the cover panel 130, the access opening 310 may be located at any position on the cover panel 130. For example, the access opening 310 may be positioned within the cover panel's lower right corner, upper right corner, upper left corner, or along the top edge of the cover panel 130, along the bottom edge of the cover panel 130, etc.

Figures 2B, 2C:
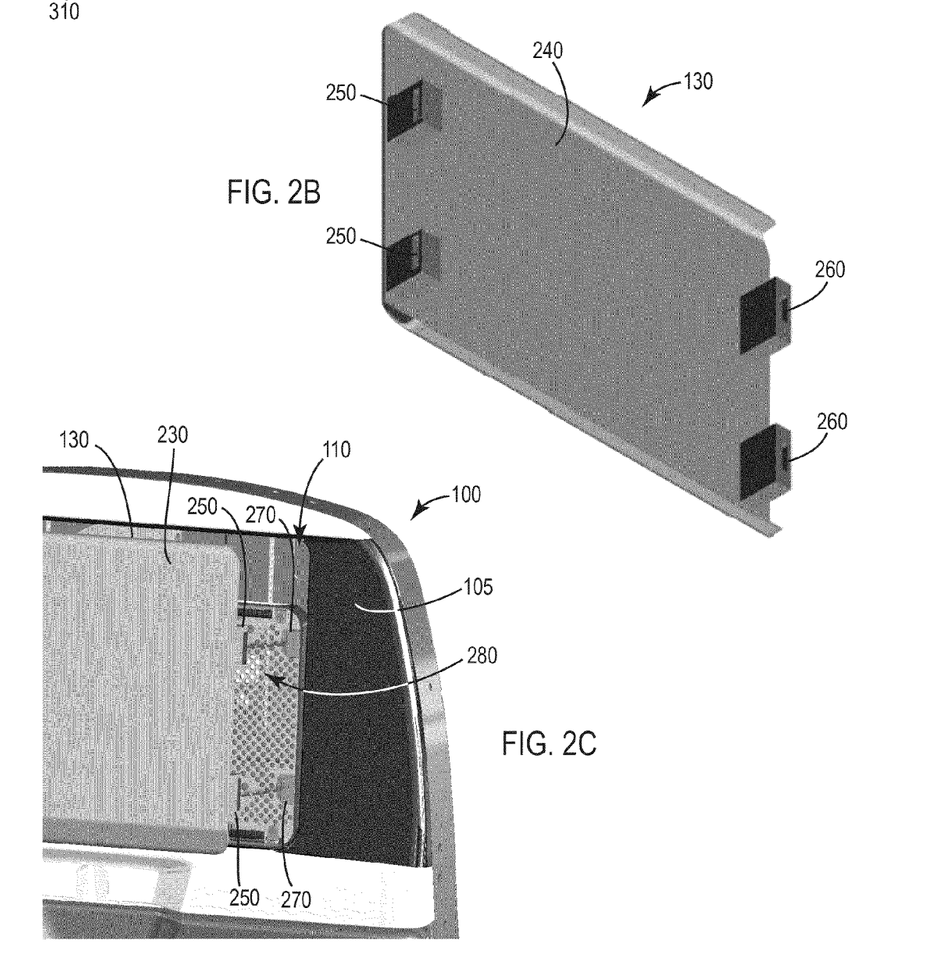
FIG. 2B is a perspective front view schematic illustration of an inner surface of a cover panel, according to an exemplary embodiment.
FIG. 2C is an exploded perspective view schematic illustration of a cutout of the cover panel connecting to the receptacle area of the reconfigurable seatback system illustrated in FIG. 1, according to an exemplary embodiment.
Figure 2D:
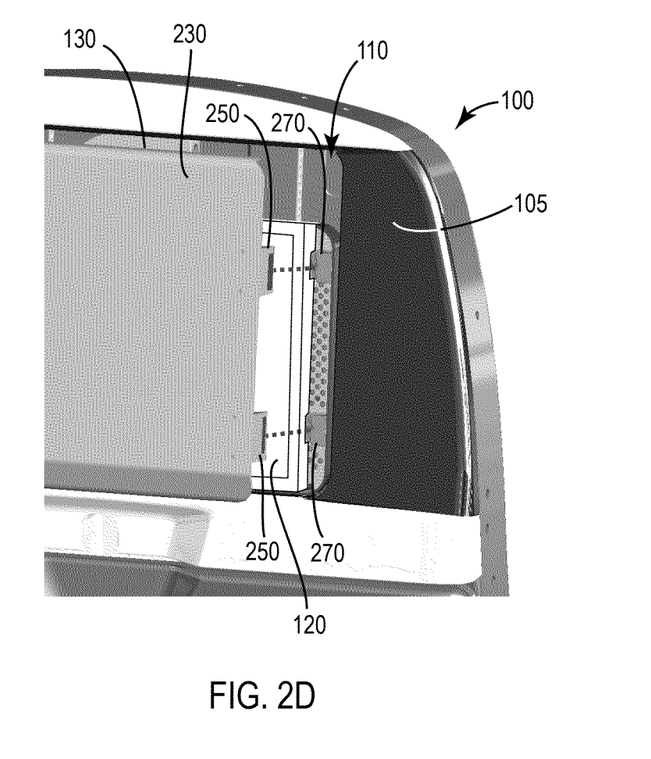
FIG. 2D is an exploded perspective view schematic illustration of a cutout of the cover panel connecting to the receptacle area with a display positioned in the receptacle area of the reconfigurable seatback system illustrated in FIG. 1, according to an exemplary embodiment.

With reference to FIG. 2B, an example illustration of an inner surface 240 of a cover panel 130 is shown. According to one example embodiment, the cover panel 130 may have a plurality of connective and locking members 260 attached to the cover panel 130 to facilitate the attaching and securing of the cover panel 130 to the seatback 105 and the receptacle area 110 of the seatback 105. For example, FIG. 2B shows a plurality of connective members 250 and locking members 260 extending from the interior surface 240 of the cover panel 130. Connective members 250 may project perpendicular to the cover panel 130 from one end of the cover panel 130 while locking members 260 may project from an opposite end of the cover panel 130. The locking members 260 may also project perpendicular from the cover panel 130. The locking members 260 may also have an opening or space within the edge of the structures that can accept components, such as latching extensions of a slam latch 410. According to one example, the opening on the locking members 260 may directly face the receptacle area 110 and run perpendicular with respect to the cover panel 130.

According to one embodiment, connective members 250 are configured to mount the cover panel 130 onto the seatback 105 to cover the receptacle area 110. To assist in mounting the cover panel 130, the connective members 250 can comprise an opening (i.e., slit) within each member so that a part can be inserted into the opening. According to one example, the opening in the connective members 250 can run parallel to the surface of the cover panel 130. Referring to FIG. 2C, the receptacle area 110 of the seatback 105 can include one or more mounting members 270 configured to facilitate the connection of the cover panel 130 to the receptacle area 110, according to an exemplary embodiment. The mounting members 270 can protrude from a wall of the receptacle area 110, extending perpendicular to the cover panel 130. The openings in the connective members 250 can receive the mounting members 270 to provide a secure connection to the receptacle area 110. The cover panel 130 can connect to the receptacle area 110 using a variety of connections such as mechanical, electrical, magnetic, hook and loop fastener, etc.

Figure 3:
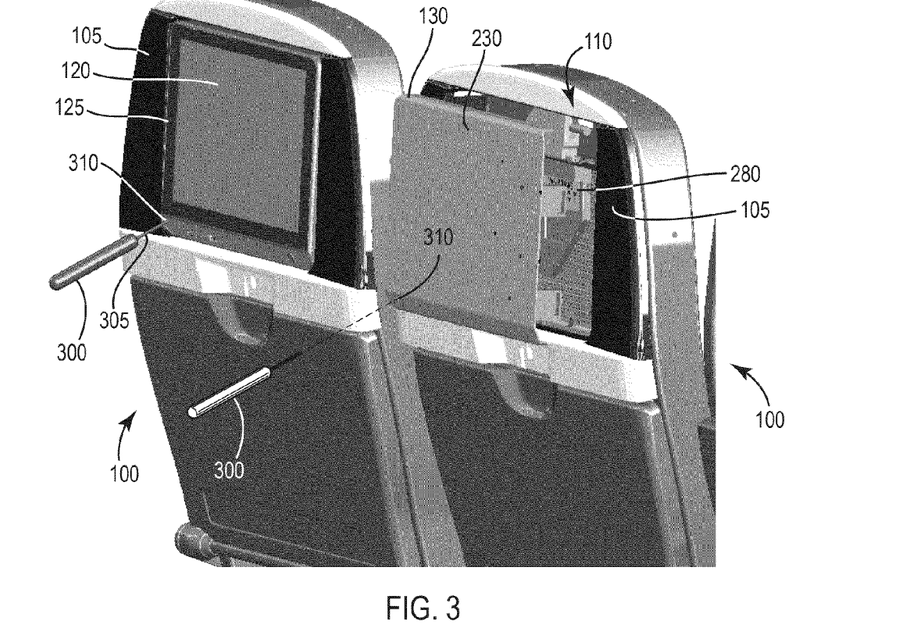
FIG. 3 is a perspective view schematic illustration of a key tool being configured to remove the display and/or the cover panel from the reconfigurable seatback system illustrated in FIG. 1, according to another exemplary embodiment.

Referring to FIG. 3, a perspective view schematic illustration of a key tool 300 being configured to remove the display 120 and/or the cover panel 130 is shown according to one embodiment. The key tool 300 (i.e., tool) can include a body having an elongated keyed portion 305, which can unlock a mechanical locking structure. The display 120 is shown with a receiving structure 310 configured to receive the elongated keyed portion 305 of the key tool 300. The cover panel 130 may also contain receiving structure (i.e. an access opening) to receive the elongated key member. The receiving structure serves as an access opening 310 for the key tool 300 and may vary in size and shape. For example, the receiving structure may be a pinhole that takes the specific shape of key tool 300 such that only the key tool 300 may be fully inserted therein to unlock the display 120 or the cover panel 130 from the receptacle area 110. According to one embodiment, a common key tool 300 may be used to unlock and receive both the display 120 and the cover panel 130. In another embodiment, two separate key tools 300 (e.g., having different shapes, sizes, cross-sections, or configurations) may be used to unlock the display 120 and the cover panel 130.

Figure 4:
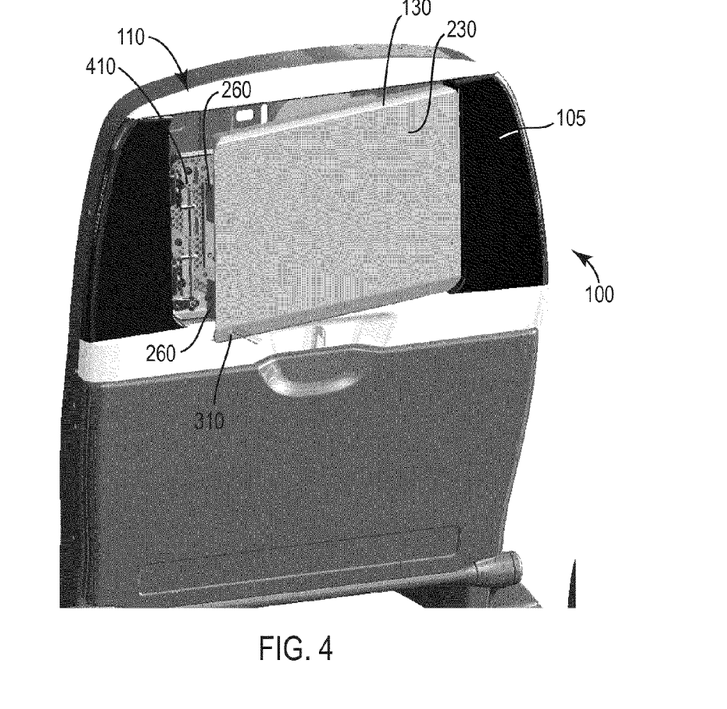
FIG. 4 is a perspective view schematic illustration of an example quick release mechanism slam latch configured to lock the cover panel to the receptacle area of the reconfigurable seatback system of FIG. 1, according to an exemplary embodiment.

According to some embodiments, the receptacle area 110 can include a locking mechanism configured to quickly and securely lock the display 120 and the cover panel 130. For example, the locking mechanism may be a quick release mechanism including a slam latch 410. FIG. 4 is a schematic view of an example slam latch 410 configured to lock the cover panel 130 to the receptacle area 110. The slam latch 410 can be a part of a quick release mechanism 410 configured to allow the cover panel 130 or the display 120 to be quickly removed from the receptacle area 110, in one embodiment. The locking members 260 can attach to and lock to portions of the slam latch 410 (for example, extending members) as shown in FIG. 4 by simply pressing the cover panel 130 inward towards the receptacle area 110. Thus, a seat can quickly be reconfigured from having a display 120 viewable to a passenger to having a cover panel 130 at any point, such as at the gate, in the wing, etc., in one embodiment.

Figure 5:
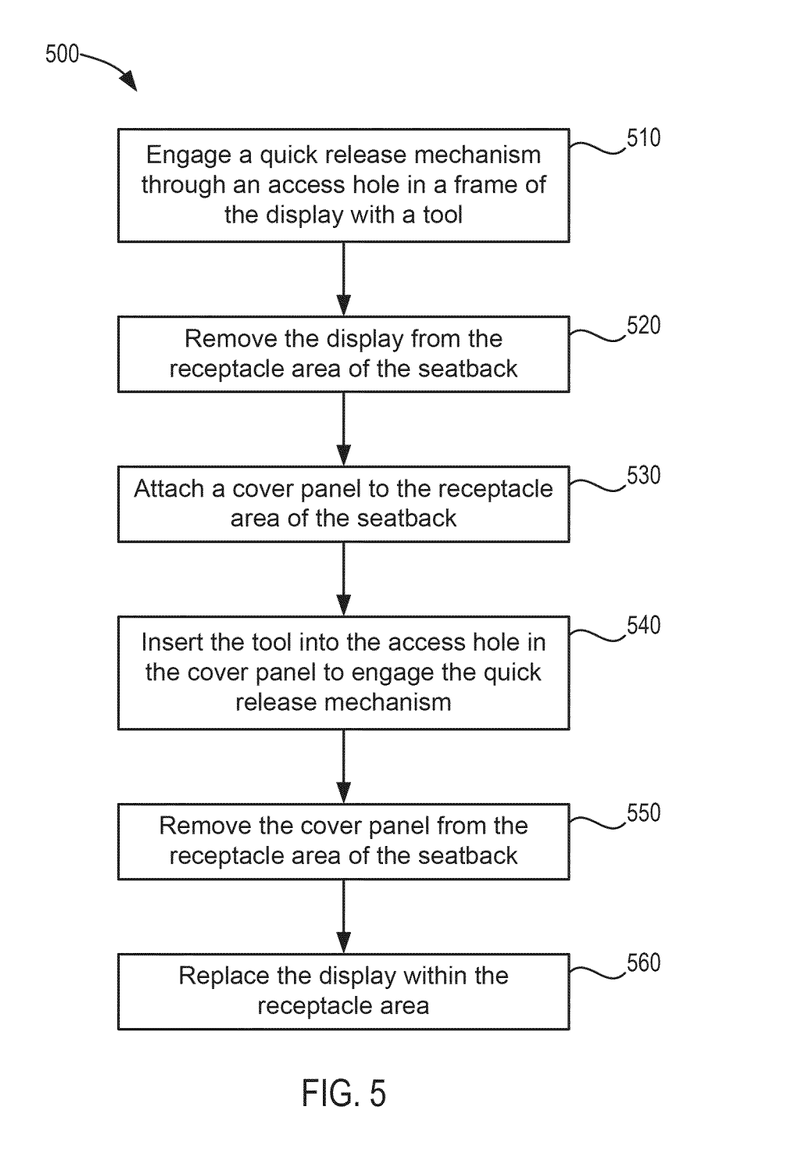
FIG. 5 is a flow chart of a process for reconfiguring a seatback of a passenger aircraft seat, according to an exemplary embodiment.

Referring to FIG. 5, a flow chart of a process for reconfiguring a seatback 105 of a passenger aircraft seat is shown, according to one embodiment. The process can include engaging the quick release mechanism 410 through an access opening 310 in a frame 125 of the display 120 with a key tool 300 (step 510) in one embodiment. The quick release mechanism 410 can be engaged by inserting the key tool 300 into the access opening 310, in one embodiment. The key tool 300 can engage a part of the quick release mechanism 410 to cause the display 120 to be unlocked from the position, in one embodiment. The process can also include removing the display 120 from the receptacle area 110 (step 520), in another embodiment. According to one exemplary embodiment, the display 120 can be removed from the receptacle area 110 once the quick release mechanism 410 has been engaged to unlock the display 120 from the receptacle area 110. In one embodiment, the display 120 may be stowed away until further needed. The display 120 can also be serviced and maintained when it is removed from the receptacle area 110, allowing airlines to provide continued, uninterrupted service.

According to one embodiment, the process can involve attaching a cover panel 130 to the receptacle area 110 of the seatback 105 (step 530). The cover panel 130 can be attached to the receptacle area 110 by hooking the connective members 250 of the cover panel 130 onto the mounting members 270 in the receptacle area 110, in one embodiment. It is to be understood that the cover panel 130 can be attached to the receptacle area 110 according to any structure, manner, or method known in the art. In one embodiment, the outer surface 230 of the cover panel 130 is substantially co-planar with the back surface of the seatback 105. Thus, the cover panel 130 can substantially blend in with the back surface of the seat 100 as to disguise the receptacle area 110 from a passenger facing the seatback 105, according to an embodiment.

The process provides for the seatback 105 to quickly be reconfigured to have a display 120 within the receptacle area 110. The process may include, inserting the key tool 300 into the access opening 310 on the cover panel 130 to engage the quick release mechanism 410 (step 540). The key tool 300 may engage a part of the quick release mechanism 410 to cause the cover panel 130 to be unlocked from the position. According to one embodiment, the display 120 is locked within the receptacle area 110 under the cover panel 130. In such case, the key tool 300 may be inserted into an access opening 310 of both the cover panel 130 and the display 120 to unlock the display 120 and cover panel 130 from the position within the receptacle area 110. Once the cover panel 130 is unlocked, the process can further include removing the cover panel 130 from the receptacle area 110 of the seatback 105 (step 550), in one embodiment. According to one embodiment, the cover panel 130 can be removed by gently pulling on the cover panel 130. In other embodiments, the cover panel 130 opens at one end once unlocked and is unhooked from the mounting members 270 to remove the cover panel 130 from the seatback 105. The process can include replacing the display 120 within the receptacle area 110 (step 560), according to an exemplary embodiment. In some embodiments, the same display 120 removed from the display can be affixed to the receptacle area 110 or a different display can be placed in the receptacle area 130. According to some embodiments, the display 120 can contain a frame 125 that borders one or more edges of the display 120. In one embodiment the frame 125 can comprise a durable plastic material and can be configured to hook on or attach to the receptacle area 110 according to any method known in the art.

Figure 6:
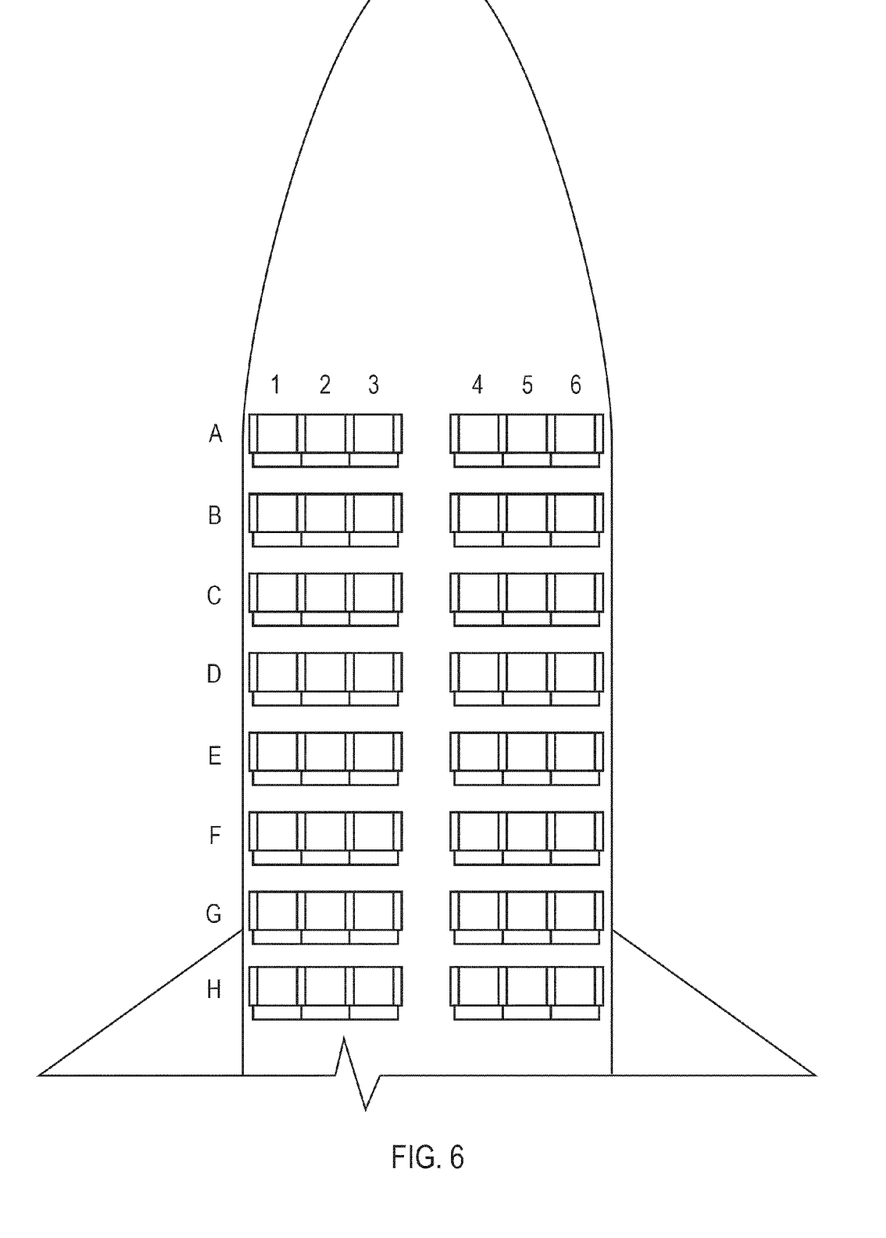
FIG. 6 is a schematic block diagram of a reconfigurable seating area in an aircraft, according to an exemplary embodiment.

In some embodiments, the interchangeability of the display 120 and cover panel 130 as described throughout the application allows an airline service the flexibility to offer a variety of packages and services to passengers. For example, with the systems and methods described throughout, an airline can alter the seating arrangements to provide varying services while maintaining differentiation between the travel class experiences, thus justifying the price differentiation. In FIG. 6, a schematic diagram of a reconfigurable seating area in an aircraft, according to an example embodiment, is shown. The illustrated aircraft seating area has 8 rows (row A-H) with six seats in each row (seat 1, seat 2, seat 3, seat, 4, seat 5, and seat 6) for a total of 48 seats. In one embodiment, the rows are evenly split with an aisle down the middle, resulting in 24 seats on each side of the aisle. In one embodiment, there can be additional rows in the aircraft of FIG. 6 that is now shown in the illustration. It is understood that the use of the above seating area is by example only, and the reconfigurable seating arrangement can be implemented on any passenger aircraft having any number of rows, seats, aisles, seat groupings, etc. Examples of the flexibility of a reconfigured seating arrangement provided by the disclosure are listed below. Particular seats may be identified by the row alphabet and seat number. For example, seat 2 in row C can be identified as seat C2.

According to one example, an airline can configure the seating area in FIG. 6 as a business class section and configure additional rows behind row H (not shown on FIG. 6) as a coach class section. The business class section can be differentiated from the coach class section based on services received and space allowed in some embodiments. In one embodiment, as part of the business class services, the passengers can enjoy in-seat entertainment by way of displays 120 placed in the seatbacks 105 of the row of seats 100 in front of the passenger. For example, a passenger occupying E1 is able to view the display 120 in the seatback 105 of D1, the passenger occupying D1 is able to view the display 120 in the seatback 105 of C1, the passenger occupying C1 is able to view the display 120 of in the seatback of B1, and so on. In one embodiment, business class passengers can also be afforded increased space as described below.

To provide passengers in the business class section with extra space, an airline may keep a seat (i.e., the middle seat) open by refraining from selling a ticket for the middle seat, in some embodiments. For example, referring to FIG. 6, middle seats A2, B2, C2, D2, E2, F2, G2, H2, A5, B5, C5, D5, E5, F5, G5, and H5 would remain empty in a business class configuration while the window seats and aisle seats would be open to passengers. In a typical coach class, all of the seats are offered for sale and in-seat entertainment may not be available to the passengers. Due to the structure and limitations of current in-seat entertainment systems on airlines, converting all or a portion of the rows from business class to coach class (or vice versa) presents significant challenges.

Using the systems and methods described herein, seating areas in an aircraft as shown in FIG. 6 can be converted to coach class, according to some embodiments. For example, if an airline desires to increase its coach class offering to accommodate an increase in travel during high travel periods (e.g., summer, holidays, etc.), the aircraft can offer the middle seats for sale. To maintain the differentiation between the business class and the coach class, the airline can also remove the display 120 from the receptacle area 110 of each seatback 105 viewable by a coach passenger (e.g., the seatback 105 positioned directly in front of the coach passenger), according to an embodiment. As an example, to convert rows F, G, and H into coach class seating, an airline can fill seats F2, G2, H2, F5, G5, and H5. The displays 120 positioned in the receptacle area 110 of the seatbacks 105 of rows E, F, and G would each be removed and replaced by a cover panel 130, in one embodiment. Removing the displays 120 from the seatbacks 105 as opposed to allowing the displays 120 to remain in the seatbacks 105 and directly viewable to the passenger not only maintains the differentiation between the classes but does so graciously to at least diminish the effects of the differentiation, in one embodiment. For example, having a non-working display 120 in the passenger's personal view may unnecessarily taunt the passenger. Likewise, removing the display 120 and having an empty receptacle area 110 for viewing by the passenger is also undesirable. Thus, according to one embodiment, the cover panel 130 can be placed on the reconfigured seats to close the receptacle area 110 and make the reconfigured seats look the same as the other seats. To reconfigure the rows F, G, and H into business class, the middle seats would be emptied and the display 120 would be replaced into the receptacle area 110, in one embodiment.

The system and methods described herein can also provide airlines the flexibility to provide additional class seating configurations (e.g., a three class seating configuration). For example, an additional class seating configuration may include an upgrade class that allows a passenger to purchase in-seat entertainment for the display 120. For example, if row H is not business class seating (e.g., the middle seat can be filled), then a passenger in seat G2 may be able to upgrade to in-seat entertainment. A video display 120 would be placed in the receptacle area 110 of F2 for view by the customer. In another example, the entire row of G may be classified as upgraded coach, thus seats G1, G2, G3, G4, G5, and G6 may be occupied and also have access to the display 120 in the seatbacks 105 of F1, F2, F3, F4, F5, and F6.

While the detailed drawings, specific examples, and particular configurations given describe preferred and exemplary embodiments, they serve the purpose of illustration only. The inventions disclosed are not limited to the specific forms shown. For example, methods described may be performed in any of a variety of sequence of steps or according to any of a variety of mathematical formulas. The systems and methods depicted and described are not limited to the precise details and conditions disclosed. The flow charts show preferred exemplary operations only. The specific data types and operations are shown in a non-limiting fashion. Furthermore, other substitutions, modifications, changes, and omissions may be made in the design, operating conditions, and arrangement of the exemplary embodiments without departing from the scope of the invention as expressed in the appended claims.

What is claimed is:

1. A reconfigurable seatback system comprising:
a display configured to provide in-flight entertainment to a passenger of an aircraft;
a receptacle area positioned in a seatback of the aircraft, the receptacle area configured to releasably receive and hold the display via a first connection; and
a cover panel configured to cover the receptacle area via the first connection when the display is not positioned within the receptacle area and to cover the receptacle area via a second connection when the display is positioned within the receptacle area.

2. The system of claim 1, further comprising a quick release mechanism configured to release at least one of the display and the cover panel from the receptacle area when engaged by a tool.

3. The system of claim 1, wherein the receptacle area comprises a slam latch configured to securely lock the cover panel into the receptacle area.

4. The system of claim 1, further comprising a tool configured to remove the display from the receptacle area, the tool having an elongated keyed portion.

5. The system of claim 4, wherein the display is bordered by a frame, the frame having an access opening configured to receive the elongated keyed portion of the tool therein.

6. The system of claim 1, further comprising a tool configured to remove the cover panel from the receptacle area, the tool having an elongated keyed portion.

7. The system of claim 6, wherein the cover panel comprises an access opening configured to receive the elongated keyed portion of the tool therein.

8. The system of claim 1, further comprising a tool having an elongated keyed portion configured to be inserted into an access opening in the cover panel and a frame of the display to release the cover panel and the display from the receptacle area.

9. The system of claim 1, wherein the cover panel comprises a hard plastic backed with fabric.

10. The system of claim 1, wherein the display comprises a liquid crystal display.

11. A reconfigurable seatback compatible with an in-seat entertainment system, the reconfigurable seatback comprising:
a front surface configured to support the back of a passenger sitting in an attached seat;
a back surface facing away from the front surface; and
a receptacle area positioned within the back surface of the reconfigurable seatback,
wherein the receptacle area is configured to securely hold a display releasably positioned therein via a first connection, the display being a part of the in-seat entertainment system on an aircraft;
wherein the receptacle area is configured to receive a cover panel via the first connection when the display is not positioned within the receptacle area; and
wherein the receptacle area is configured to receive the cover panel via a second connection when the display is positioned within the receptacle area.

12. The reconfigurable seatback of claim 11, wherein the display has a bordering frame with a first tool receiving structure within the frame and the cover panel has a second tool receiving structure therein, the first tool receiving structure and the second tool receiving structure configured to receive a common tool to detach the display and the cover panel from the receptacle area.

13. The reconfigurable seatback of claim 12, wherein the first tool receiving structure and the second tool receiving structure substantially align such that the common tool may be inserted into both the first tool receiving structure and the second tool receiving structure at the same time.

14. The reconfigurable seatback of claim 11, wherein the display is a liquid crystal display.

15. The reconfigurable seatback of claim 11, wherein the cover panel comprises a hard material backed with a fabric material configured to blend with the back surface of the seatback.

16. A method of reconfiguring a seatback of a passenger aircraft seat with a receptacle area positioned in the seatback, the receptacle area having a display positioned therein by a quick release mechanism, the method comprising:
engaging the quick release mechanism through an access opening in a frame of the display with a tool;
removing the display from the receptacle area; and
attaching a cover panel to the receptacle area of the seatback by the quick release mechanism after the display is removed from the receptacle area and attaching the cover panel to the receptacle area of the seatback by a second connection when the display is positioned within the receptacle area, the cover panel being substantially flush with a back surface of the seat.

17. The method claim 16, further comprising:
inserting the tool into the access opening on the cover panel to engage the quick release mechanism;
removing the cover panel from the receptacle area; and
replacing the display within the receptacle area.

18. The method of claim 17, further comprising inserting a different display into the receptacle area than was removed.

19. The method of claim 16, wherein the cover panel comprises a first tool receiving structure configured to receive a first tool configured to lock and unlock the cover panel from the frame;
wherein the display comprises a second tool receiving structure configured to receive a second tool configured to unlock the display from the frame; and
wherein the first tool is different from the second tool.

20. The method of claim 19, wherein the cover panel extends from a back surface of the seat to accommodate the display in the receptacle area.

* * * * *